(12) United States Patent
Yamamoto

(10) Patent No.: US 7,092,346 B2
(45) Date of Patent: Aug. 15, 2006

(54) PHOTODETECTOR AND OPTICAL PICKUP DEVICE

(75) Inventor: Takahiro Yamamoto, Tokyo (JP)

(73) Assignee: TEAC Corporation, (JP)

( * ) Notice: Subject to any disclaimer, the term of this patent is extended or adjusted under 35 U.S.C. 154(b) by 568 days.

(21) Appl. No.: 10/632,185

(22) Filed: Jul. 30, 2003

(65) Prior Publication Data

US 2004/0081050 A1    Apr. 29, 2004

(30) Foreign Application Priority Data

Jul. 30, 2002    (JP)    ............................ 2002-220778

(51) Int. Cl.
*G11B 7/00*    (2006.01)
(52) U.S. Cl. ................ 369/116; 369/53.26; 369/112.01; 369/44.41; 369/47.5
(58) Field of Classification Search ............. 369/53.26, 369/116, 120, 121, 44.41, 44.42, 47.5, 53.1, 369/124.01, 112.01
See application file for complete search history.

(56) References Cited

U.S. PATENT DOCUMENTS 6,445,670 B1 *   9/2002   Oshima ...................... 369/116

OTHER PUBLICATIONS

Patent Application No. 2002-008263 Published on Jan. 11, 2002 in the name of inventor Takahashi Yoshitaka (applicant Ricoh Co. Ltd.) in Japanese with an English Abstract.

* cited by examiner

*Primary Examiner*—Nabil Hindi
(74) *Attorney, Agent, or Firm*—Anderson Kill & Olick, PC

(57) ABSTRACT

A photodetector and optical pickup device which comprises: a monitoring photodetection element (photodiode) 23 for receiving laser beams having different wavelengths from laser light sources; a light source-discriminating photoreceiver 24 represented by a photodiode (240) and a wavelength selection filter (241) for discriminating the wavelength spectra of the laser light sources; and a sensitivity regulation circuit (25) for regulating the sensitivity of the monitoring photodetection element 23 in response to the light source-discriminating photoreceiver 24.

10 Claims, 6 Drawing Sheets

FIGURE 1A
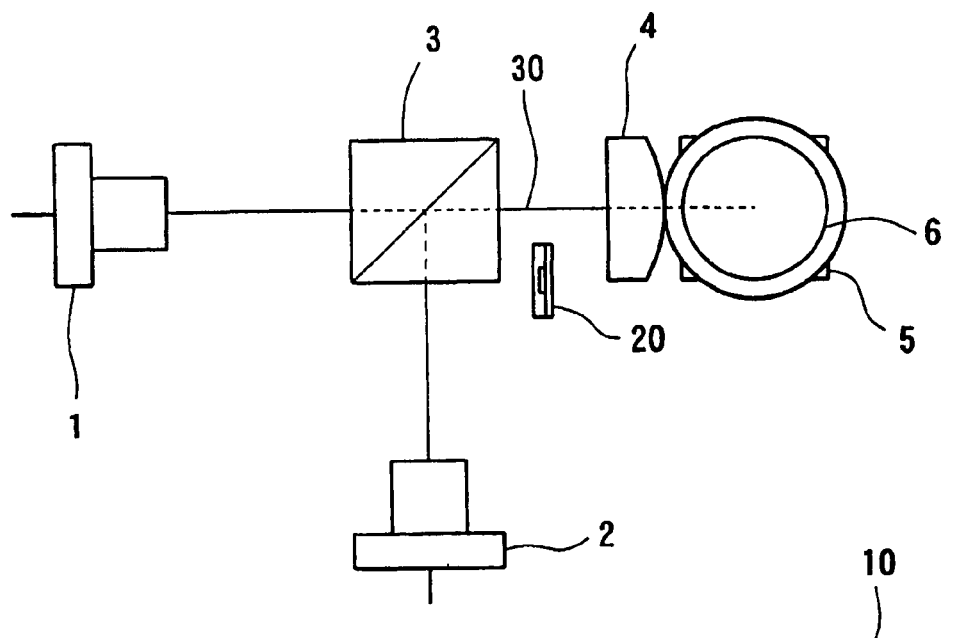
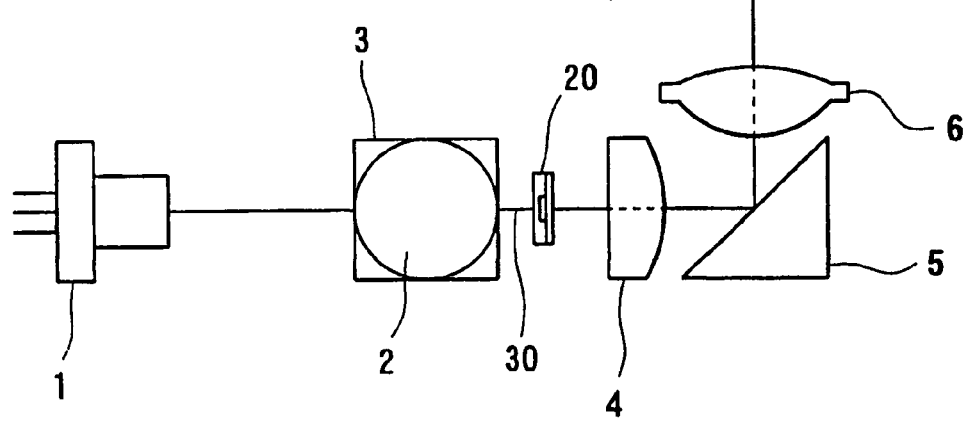
FIGURE 1B

FIGURE 2A
FIGURE 2B
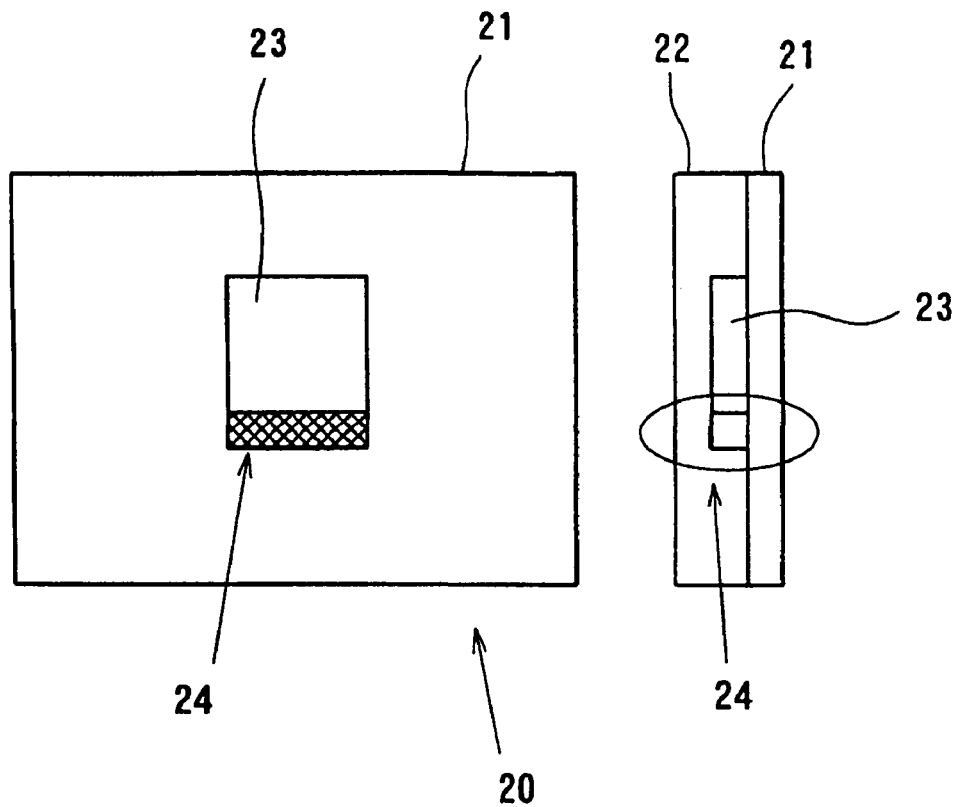
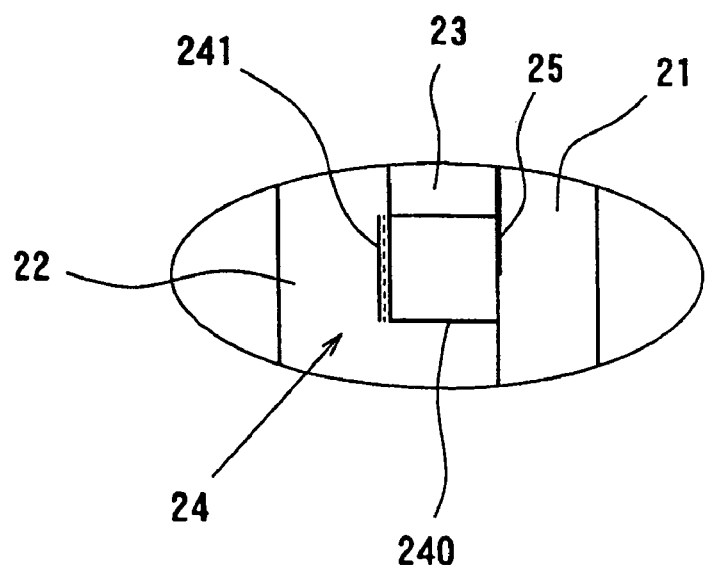
FIGURE 2C

FIGURE 5A
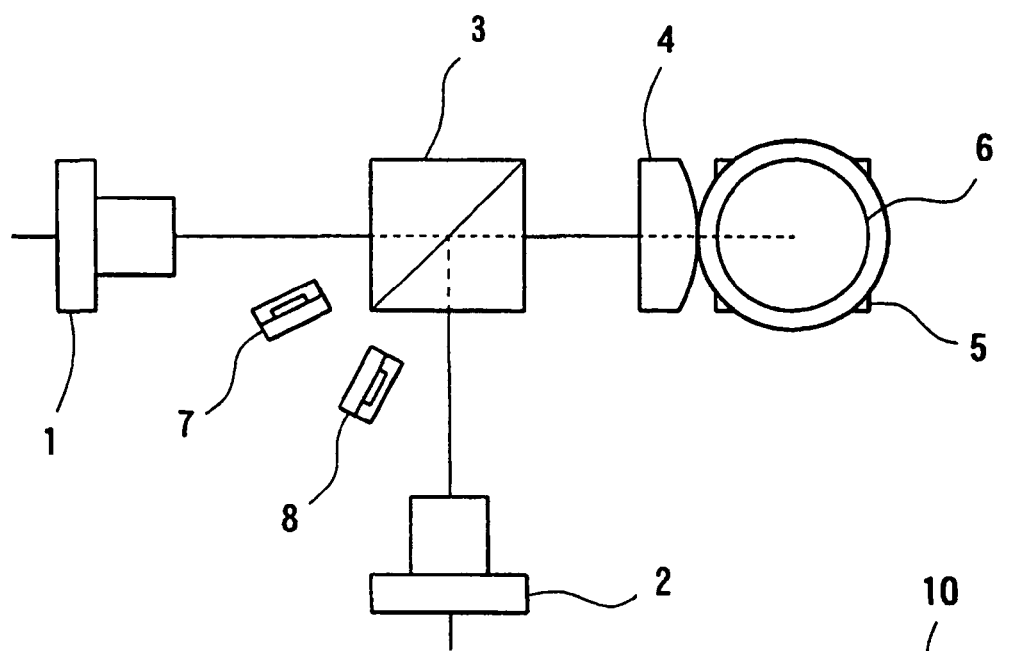
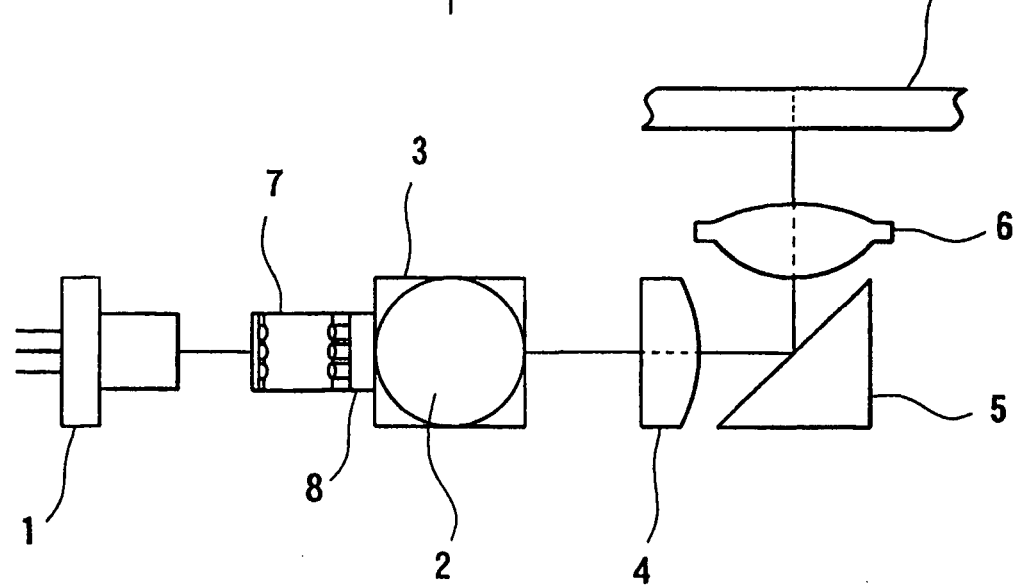
FIGURE 5B

FIGURE 6A
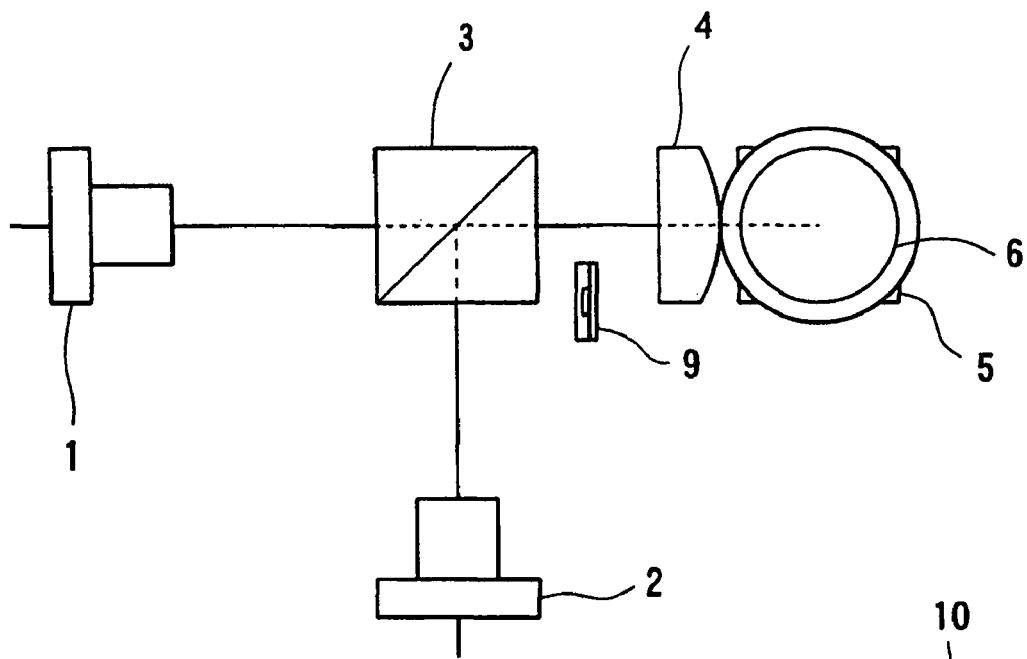
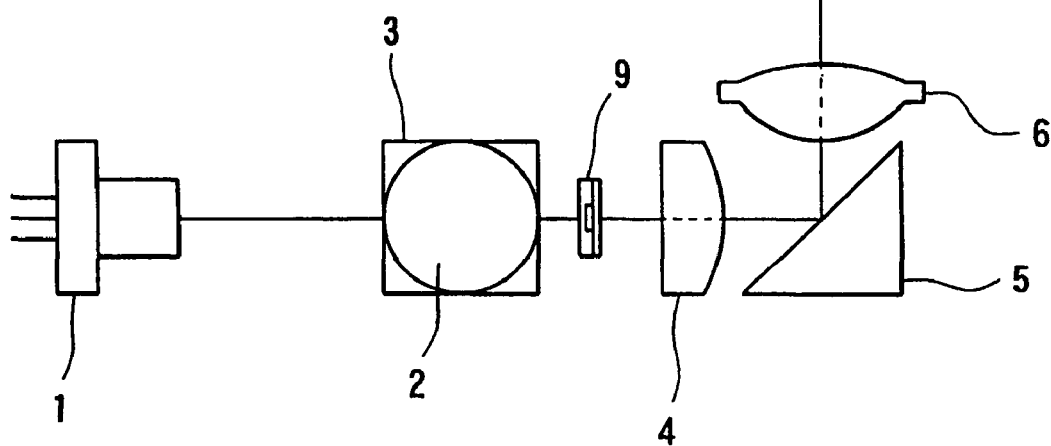
FIGURE 6B

PHOTODETECTOR AND OPTICAL PICKUP DEVICE

TECHNICAL FIELD

The present invention relates to a photodetector for detecting luminous energy from light with multiple wavelengths. The invention further relates to an optical pickup device for use in an optical system having multiple laser light sources.

BACKGROUND OF THE INVENTION

An optical system having a plurality of light sources to irradiate an optical disk for writing and reading of data is conventional. However, there are different types of optical disks that operate under different standards such as CD-ROM, CD-R (W), DVD each of which relate to a different type of media and, as such, each disk operates at a different wavelength for writing and reading of data. To accommodate these different wavelengths, an optical disk driving apparatus needs to install an optical pickup device having a light source that can output a laser beam of a wavelength suited to each type of media. A single optical disk driving apparatus that can operate under all of the different media standards with each type of optical disk employing a common optical pickup device to reduce the cost of additional equipment has been proposed. Such an optical pickup device should accommodate the different light sources and should output a laser beam of a different wavelength along a common optical laser beam path in which the light source outputs merge.

Fine tuning of the light intensity from each of the laser beams before irradiation onto an optical disk is essential to accurately image the laser beams on the optical disk, in order to flawlessly record signal data thereon, and to flawlessly reproduce data therefrom. However, it is inevitable that surrounding conditions such as temperature and the like will cause the output from each of the laser light sources to fluctuate thereby varying the intensity of the laser beams irradiated onto the optical disk. As a countermeasure, a photodetection element may be provided to monitor each laser beam output from each laser light source for regulating the coulombs of current flowing into each laser light source based on the monitoring result. Further, the condition of the optical disk or the condition of the signals recorded onto the disk may affect optimal light intensity values. In this situation, an optical pickup device should be used capable of independently controlling each of the laser light sources.

An optical system using a pickup device of conventional technology for irradiating laser beams onto an optical disk is shown in FIGS. 5A and 5B wherein divergent light is emitted from the semiconductor laser light sources 1, 2 as parallel light beams which are directed through a collimating lens 4 via a coupling prism 3 and reflected by a raised mirror 5 through an objective lens 6 onto an optical disk 10 (shown in FIG. 5B).

Photodetection elements 7, 8 are arranged in the vicinity of the laser light sources 1, 2 to detect luminous energy from divergent light emitted from the laser beams. The laser beams may directly reach the photodetection elements 7, 8, or they may be indirectly guided by a raised mirror or the like.

The photodetection elements 7, 8 in the optical pickup device detect luminous energy from each laser beam in proportion to the intensity of the laser beam. Accordingly, current flowing into the semiconductor laser light sources 1, 2 may be regulated based on the output from photodetection elements 7, 8, for controlling the intensity of the laser beam output of each light source.

Nonetheless, the configuration of FIGS. 5A and 5B have a problem in that for every laser beam of a different wavelength a separate photodetection element is required, thereby increasing manufacturing costs and decreasing the available space in an optical pickup to accommodate the multiple photodetection elements.

To overcome this drawback, one may consider a pickup device in which a single photodetection element 9 is used and arranged in the vicinity of the optical path of the laser beam after passing through coupling prism 3 as is illustrated in FIG. 6. Currently, the output of a laser diode for a CD system is at least 200 mW or over and the output of a laser diode for a DVD system is 100 mW or less. In addition the photodetection element for a CD system has its sensitivity peak near 780 nm, which levels off about 20% i.e. its sensitivity drops off 20% for a DVD system which utilizes a wavelength of, for example, 650 nm. It is, therefore, difficult for a single photodetector 9 alone to be used in the configuration of FIG. 6 to detect the luminous energy of laser beams having different wavelengths and to control the current level flowing into both semiconductor laser diodes 1 and 2.

The present invention overcomes the problems of using a single photodetector and provides an optical pickup device capable of controlling multiple laser light sources without space or arrangement limitations. Moreover, the photodetector of the present invention can automatically regulate the sensitivity of a selected laser beam of given wavelength spectra, eliminating the need for multiple photodetectors. Consequently the need for a control circuit in the external control system and the need for a cable for signal control are also eliminated, further allowing a reduction of manufacturing costs.

SUMMARY OF THE INVENTION

The photodetector of the present invention comprises: a monitoring photodetection element for detecting luminous energy from the output of different laser light sources having different wavelengths; a light source-discriminating photoreceiver for discriminating between the wavelength spectra of each of the different laser light sources and a sensitivity regulation circuit responsive to said light source-discriminating photoreceiver for controlling the sensitivity of the monitoring photodetection element with respect to said light sources in response to the output of the light source discriminating photoreceiver.

The light source-discriminating photoreceiver in the photodetector of the present invention is responsive to the wavelength spectra of the received laser beam light energy and provides different values of output corresponding to different wavelength spectra.

The photodetector of the present invention further comprises a filter for filtering the wavelength spectra of the different laser beams such that the discriminating photodetection element can readily discriminate between different wavelength spectra. The filter is preferably arranged adjacent the incoming end of the discriminating photodetection element on a common printed circuit board with the monitoring photodetection element.

The photodetector regulation circuit provides different switching sensitivities according to the output value of the light source-discriminating photoreceiver.

The monitoring photodetection element and the sensitivity regulation circuit are provided on the same printed circuit board e.g. a flexible printed circuit board (FPC).

The monitoring photodetection element and the light source-discriminating photoreceiver are arranged to maintain the laser beams incident along an optical path that is common to beams of different wavelengths.

The optical pickup device of the present invention is for use in an optical system having a plurality of laser light sources for generating laser beams of different wavelengths to be irradiated along a common optical path onto an optical disk to read or write data therefrom and comprises: a monitoring photodetection element arranged in proximity to the laser beams to detect luminous energy from each of said light sources; a light source-discriminating photoreceiver for discriminating between the wavelength spectra of each of said light sources and for providing an output distinct to each wavelength spectra; and a sensitivity regulation circuit for regulating the sensitivity of the monitoring photodetection element in response to the output of the light source-discriminating photoreceiver.

According to the present invention, the laser beam output from laser each of the light sources is received by a monitoring photodetection element and by the light source-discriminating photoreceiver of the photodetector. The light source-discriminating photoreceiver discriminates between the different laser beams based upon the wavelength thereof. The output of the discriminating photoreceiver is communicated to a sensitivity regulation circuit so as to adjust the sensitivity of the monitoring photodetection element based on the output i.e., to appropriately regulate the sensitivity of the monitoring photodetection element in accordance with each wavelength of each laser beam. For example, the output of the monitoring photodetection element can be regulated so that its output is equalized relative to either laser light source and may be used to control the outputs of the laser light sources.

The optical pickup device of the present invention may include more than two light sources each providing an output laser beam of a different wavelength. Alternatively, a laser light source having an output with a variable wavelength may be used provided the light source-discriminating photoreceiver can determine which wavelength the laser light source outputs.

The photodetector of the present invention may be used in an optical pickup device that optically writes or reproduces data to/from an optical disk. In an optical reproduction apparatus or an optical recording/reproducing apparatus, appropriate control of the output from the laser light sources provide error free recording and/or reproduction of data onto/from an optical disk. It should be understood however, that applications of the present invention are not limited to an optical pickup device. The photodetector can be applied to a variety of fields in which luminous energy from beams of different wavelengths may be detected such as, for example, for use in optical communications.

BRIEF DESCRIPTION OF THE DRAWINGS

FIG. 1A is a plan view of an optical system including the optical pickup device of the present invention;

FIG. 1B is a front view of the optical system of FIG. 1;

FIGS. 2(A–C) show a plan view, side view, and an exploded side view respectively of the photodetector of the present invention;

FIGS. 5A and 5B represent a plan view and front view respectively of an optical system of known technology in which photodetection elements for CD and DVD systems are arranged for optical pickup in an independent manner; and FIGS. 6A and 6B represent a plan view and a front view respectively of an optical system similar to FIGS. 5A and 5B using a common photodetection element for both CD and DVD systems.

DETAILED DESCRIPTION OF A PREFERRED EMBODIMENT

Figure 3:
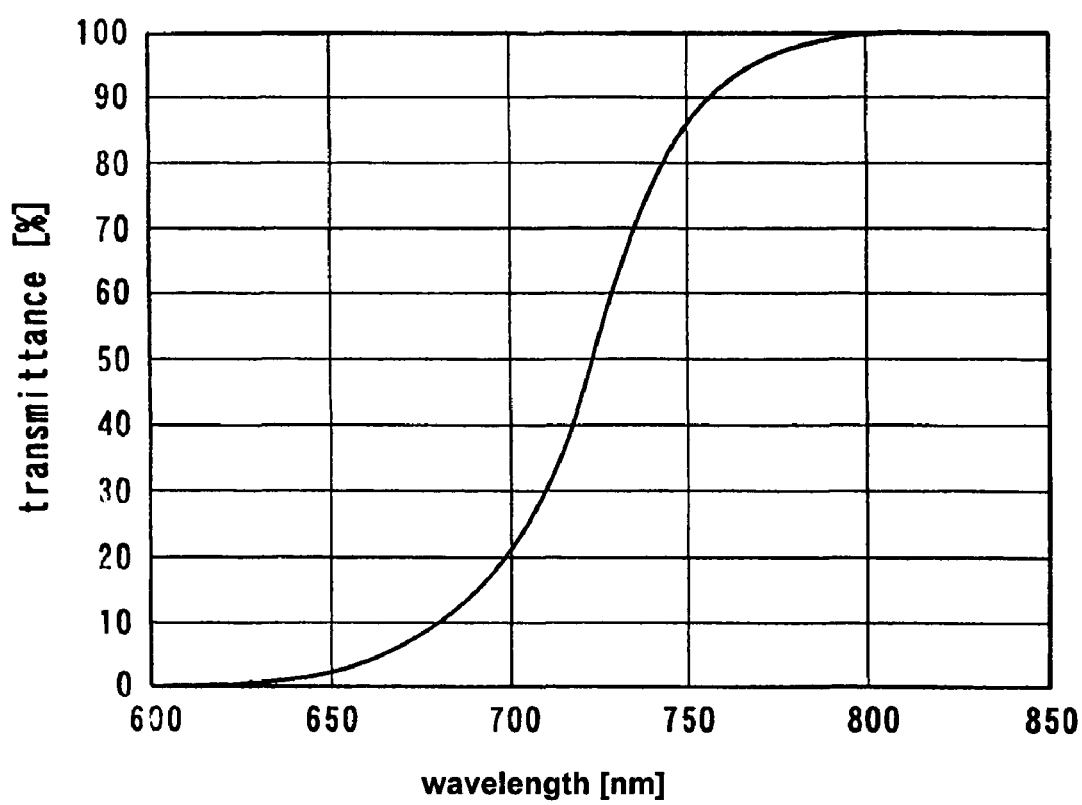
FIG. 3 is a diagram illustrating the spectral characteristics for the wavelength selection filter in the photodetector of the present invention.

An embodiment of the present invention is described herein with reference to FIGS. 1–4.

FIG. 1A is illustrative of an optical system using the optical pickup device of the present invention for accommodating CD/DVD type disks. The optical components in each of the other figures which are common to the optical system of FIG. 1A, are given the same reference numbers to simplify the description.

The semiconductor laser diodes 1, 2 emit divergent laser beams which are coupled by coupling prism 3 and laser directed along an optical path 30 to the collimating lens 4 to form parallel laser beams which further reflected by raised mirror 5 through an objective lens 6 for irradiation onto an optical disk 10 as shown in FIG. 1B. Light reflected from the optical disk 10 may be used to reproduce the data in a conventional manner using a receiving device (not illustrated). Photodetector 20 of the present invention is arranged in the space near the optical path 30 such that part of the divergent laser beams will enter the space for detection by the photodetector 20.

As shown in FIGS. 2A–2C, photodetector 20 includes a photodiode 23 and another photodiode 240 with each arranged adjacent to each other on a single printed circuit board 21 molded on a resin body 22. Photodiode 23 represents the monitoring photodetection element of the photodetector 20 and photodiode 240 represents the discriminating photodetection element for the discriminating photoreceiver of the photodetector 20. A wavelength selection filter 241 is included in the photodetector 20 arranged at the incoming end of photodiode 240 to filter the laser beams entering the photodiode 240 as will be explained hereinafter. The photodiode 240 in combination with the wavelength selection filter 241 forms the discriminating photoreceiver of the photodetector 20. The placement of the selection filter 241 at the front end of the photodiode 240 is not critical and may be located at the rear end.

The photodetector 20 has a detection field divided into two, with one side used as a photodiode 23 functioning as a monitoring element and another side used as a photodiode 240 for light source distinction. That is, the photodiodes 23 and 240 respectively as independent photodiodes. The wavelength selection filter 241 is arranged only at the detection field of the photodiode 240 for use in distinguishing the light source spectra according to the detection output of the photodiode 240.

Any combination of wavelength filter 241 and photodiode 240 may be used to form a discriminating photoreceiver for the photodetector 20 of the present invention. The function of the discriminating photoreceiver is to distinguish the light source wavelength spectra between the light sources as will be further explained hereinafter in conjunction with the operation of the sensitivity regulation circuit 25.

The wavelength filter 241 is preferably of the type that does or does not transmit light based on its transmittance to different wavelength spectra.

The function of the sensitivity regulation circuit 25 is to adjust the output from the monitoring photodetection element (photodiode) 23 and to regulate the output value thereof by adjusting the amplification factor thereof. Sensitivity may be regulated continuously or in a stepwise manner.

It is desirable for the monitoring photodetection element 23 and the light source-photodetection element 240 and filter 241 to be arranged on the same circuit board 21 such that a complete sensitivity adjustment is provided thereon. By doing so, the need for installing a cable from an external control system or a control terminal is eliminated.

The preferred wavelength selection filter 241 has a high transmittance to a wavelength spectra over 750 nm and has a significantly smaller transmittance to wavelengths of less than 700 nm as illustrated in the graph of FIG. 3. The photodiode 23 detects luminous energy from both laser light sources 1 and 2. The wavelength selection filter 241 permits transmittance from only the light source with a wavelength spectrum of over 750 nm, and does not substantially permit transmittance from the light source for DVD which is 650 nm or less. Assume the oscillation wavelength of the semiconductor laser light source 2 is 780 nm, e.g. for use in CD's then the laser beam output from semiconductor laser light source 1 should transmit through the wavelength selection filter 241 to reach photodiode 240. Likewise, assume that the oscillation wavelength coming from the semiconductor laser beam of semiconductor laser light source 2 is 650 nm, e.g., for use in DVD's, then the laser beam output from the semiconductor laser light source 2 should not transmit through the wavelength selection filter 241. Accordingly, in this situation only the beam that is emitted from one of the two semiconductor laser light sources 1 or 2 will cause photodiode 240 to generate adequate photocurrent to perform a switching function.

Figure 4:
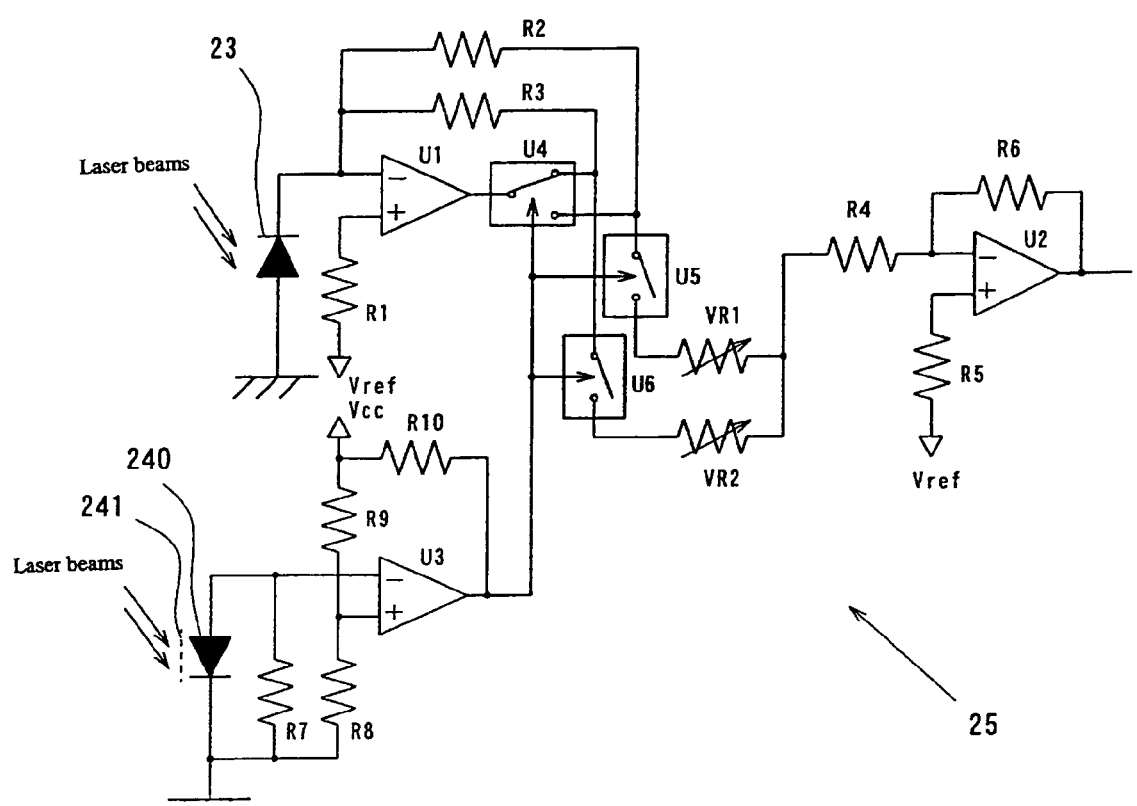
FIG. 4 is a circuit diagram of the sensitivity regulation circuit in the photodetector of the present invention.

FIG. 4 illustrates a circuit electrically connected to the photodiodes 23, 240, which is included on the printed circuit board 21 except for variable resistors to be described later. The circuit 25 shown in FIG. 4 represents the preferred sensitivity regulation circuit for the photodetector and optical pick up of the present invention.

More specifically, photodiode 23, which is the monitoring photodetection element, is grounded at the reverse current end of the photodiode 23 with its forward current end connected to the negative or inverting input terminal of the operational amplifier U1. Negative feedback resistors R2, R3 are connected between the inverting input terminal and the output terminal of operational amplifier U1 through separate contacts of relay U4. Different resistivity values are given to each of resistors R2 and R3 such that operational amplifier U1 can switch from one amplification factor to another based upon operation of relay U4 are based upon which one of resistors R2 or R3 is switched into the circuit. A reference voltage is supplied to the positive or non-inverting input terminal of the operational amplifier U1 via resistor R1. Moreover, the output terminal end of operational amplifier U1 is configured such that it is selectively connected to either one of the variable resistors VR1 or VR2 via relays U5 and U6.

Variable resistors VR1 and VR2 are used to equalize the output from VR1 and from VR2, based upon the operation of relay U4, U5 and U6 respectively. Variable resistors VR1 and VR2 may be attached to an appropriate place outside the printed circuit board 21 to provide the required adjustment when needed. The variable resistor VR1 or VR2 which is not selected, is connected to the negative or inverting input terminal of operational amplifier U2 via resistor R4. A negative feedback resistor R6 is connected between the inverting input terminal of operational amplifier U2 and the output terminal thereof. A reference voltage is supplied to the non-inverting input terminal via resistor R5.

Photodiode 240 is grounded at the forward current end and its inverting current end is connected to the negative or inverting input end of operational amplifier U3 with resistor R7 connected across photodiode 240 in parallel. The positive or non-inverting input terminal end of operational amplifier U3 is connected to an offset power supply voltage Vcc through voltage dividing resistors R8, R9. Positive feedback resistor R10 is connected between the output terminal of operational amplifier U3 and the power supply voltage Vcc. The output terminal end of operational-amplifier 3 is also connected to the switching input terminal of each of the relay U4, U5, U6 respectively.

The circuit 25 operates in response to the detection at photodiodes 23 or 240 of a laser beam output from the semiconductor laser light sources 1 or 2 respectively.

Photodiode 23 generates photo current upon incidence of a laser beam. The generated photo current is supplied to operational amplifier U1 causing the negative or inverting output to be amplified by an amplification factor based upon which of the negative feedback resistors R2 or R3 has been switched in parallel across its output. When laser light source 1 emits a laser beam of long wavelength, the laser beam transmits through wavelength selection filter 241 to become incident at photodiode 240. Upon detection of the laser beam, photodiode 240 generates photocurrent, whose polarity is reversed by resistor R7 before the resulting voltage is supplied to operational amplifier U3. In contrast, when light source 2 emits a laser beam of short wavelength, it is substantially filtered out and does not transmit through wavelength selection filter 241. As a result, photodiode 240 does not generate-sufficient photocurrent to supply voltage to the inverting input terminal of operational amplifier U3. Operational amplifier U3 is configured to provide a Schmitt trigger operation based on the set values of positive feedback resistor R10, and of voltage dividing resistors R8, R9. When the laser beam does not reach photodiode 240 due to the absence of an input voltage mentioned above, the operational amplifier U3 output is high whereas when the laser beam does reach photodiode 240, the operational amplifier U3 output switches to low. Relays U4, U5 and U6 operate by the high output of the operational amplifier U3, and do not operate by the low output of the operational amplifier U3. The sensitivity regulation circuit 25 is usually set as the sensitivity for DVD, and when the laser beam for CD is emitted (that is, when the laser beam does reach photodiode 240), it is set as the sensitivity for CD.

When the wavelength spectrum of the illuminated laser beam is 780 nm, the laser beam will reach photodiode 240 and the operational amplifier U3 output is high. This switches or turns on relays U4, U5, and U6 to select negative feedback resistor R2 and variable resistor VR1 in operational amplifier U1. In contrast, when the wavelength spectrum of the illuminated laser beam is 650 nm, the laser beam does not reach photodiode 240 and the operational amplifier U3 output switches to low at which time the output of the operational amplifier U3 is low.

The voltage which is amplified by different factors of amplification, will be further amplified in operational amplifier U2 at a given factor of amplification to be output in the reversed polarity. Given an appropriately regulated luminous energy, this output of operational amplifier U2 may then be utilized as a voltage signal to control current flowing into laser light sources. As such, setting a given resistance value for resistors R2, R3 allows switching amplification factors, which is an appropriate way of regulating sensitivity. For example, in the case of laser beams in a DVD system, sensitivity to wavelength decreases about 20% at a photodiode. For this reason, R2, which is a resistor to be selected for the laser beam illuminated in a DVD system, is given a greater resistance than R3 such that R2 obtains an amplification factor that is greater than R3 to equalize the outputs from R2 and R3.

This embodiment, as described above, employs two laser beams having different wavelengths. However, the circuit may be configured such that the sensitivity of the photodiodes can be adjusted for illumination of three or more laser beams.

Advantageous Effects of the Invention

The photodetector of the present invention can automatically select a wavelength from the receiving laser beams to regulate sensitivity of the monitoring photodetection element whereby, the need for separate photodetectors for the multiple light beams and the need for controlling a switching signal using an external control system is eliminated. Consequently the need for a control circuit in the external control system and the need for a cable for signal control are also eliminated, further allowing reduction of manufacturing costs.

What is claimed is:

1. A photodetector comprising:
    a monitoring photodetection element for detecting luminous energy from the output of more than one laser light source with each laser light source providing a laser beam of luminous energy at a different wavelength spectrum;
    a light-source discriminating photoreceiver for discriminating between wavelength spectra of the different light sources for providing an output distinct to each wavelength spectra; and
    a sensitivity regulation circuit for regulating the sensitivity of said monitoring photodetection element with respect to said light sources in response to the output from said light source-discriminating photoreceiver.

2. The photodetector of claim 1 wherein said light source-discriminating photoreceiver outputs different values for different spectra of incident light.

3. The photodetector of claim 2 wherein said light source-discriminating photoreceiver comprises:
    a discriminating photodetection element; and
    a filter having a different transmittance for the different wavelength spectra of each laser beam;
    wherein said filter is arranged at the incoming end of said discriminating photodetection element.

4. The photodetector of claim 2, wherein said sensitivity regulation circuit switches the sensitivity of said monitoring photodetection element according to the output value of said light source-discriminating photoreceiver.

5. The photodetector of claim 3, wherein said sensitivity regulation circuit switches the sensitivity of said monitoring photodetection element according to the output value of said light source-discriminating photoreceiver.

6. The photodetector of claim 1, wherein said monitoring photodetection element and said sensitivity regulation circuits are located on a common printed circuit board.

7. The photodetector of claim 6, wherein said photoreceiver is mounted on said printed circuit board.

8. The photodetector of claim 1, wherein said monitoring photodetection element and said light source-discriminating photoreceiver are arranged in such a way that the laser beam from each of said different laser light sources are directed along a common optical path with said light source discriminating photoreceiver being arranged in proximity to said common optical path for detection of each wavelength spectra of each laser beam.

9. An optical pickup device for use in an optical system having different laser light sources for generating laser beams of different wavelengths to be irradiated onto an optical disk to read and/or write data thereon;
    said optical pickup device further comprising:
    a monitoring photodetection element for detecting luminous energy from each of said laser beams;
    a light source-discriminating photoreceiver for discriminating between the wavelength spectra of each of said laser light sources for providing an output distinct to each wavelength spectra; and
    a sensitivity regulation circuit for regulating sensitivity of said monitoring photodetection element with respect to said light sources in response to the output of said light source-discriminating photoreceiver.

10. The photodetector of claim 1, wherein the detection fields of said monitoring photodetection element and said photoreceiver are arranged adjacent to each other.

* * * * *